US012657616B1

(12) United States Patent
Pollard et al.

(10) Patent No.: US 12,657,616 B1
(45) Date of Patent: Jun. 16, 2026

(54) SYSTEM AND METHOD FOR VEHICLE PURCHASING ANALYTICS

(71) Applicant: UIPCO, LLC, San Antonio, TX (US)

(72) Inventors: Heather C. Pollard, Fair Oaks Ranch, TX (US); Misti Renteria, Boerne, TX (US); Cathy Faye O'Sullivan, San Antonio, TX (US); Joel E. Galvan, Helotes, TX (US); James S. Harrison, Bulverde, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 93 days.

(21) Appl. No.: 18/893,116

(22) Filed: Sep. 23, 2024

Related U.S. Application Data

(63) Continuation of application No. 15/330,824, filed on Nov. 7, 2016, now Pat. No. 12,125,089.

(60) Provisional application No. 62/251,993, filed on Nov. 6, 2015.

(51) Int. Cl.
G06Q 30/06 (2023.01)
G06Q 30/0601 (2023.01)

(52) U.S. Cl.
CPC ..... G06Q 30/0625 (2013.01); G06Q 30/0641 (2013.01)

(58) Field of Classification Search
CPC . G06Q 30/06; G06Q 30/0625; G06Q 30/0641
See application file for complete search history.

(56) References Cited

U.S. PATENT DOCUMENTS

| | | | |
|---|---|---|---|
| 10,140,655 B2 | 11/2018 | Seergy et al. | |
| 10,685,395 B1 | 6/2020 | Hecht et al. | |
| 2013/0073267 A1* | 3/2013 | Gearhart | B60L 3/12 |
| | | | 703/2 |
| 2013/0325548 A1* | 12/2013 | Kulkarni | H04M 15/8011 |
| | | | 705/7.29 |
| 2014/0279196 A1 | 9/2014 | Wilson et al. | |

(Continued)

OTHER PUBLICATIONS

Baltas, George, and Charalampos Saridakis. "An empirical investigation of the impact of behavioural and psychographic consumer characteristics on car preferences: An integrated model of car type choice." Transportation Research Part A: Policy and Practice 54 (2013): 92-110.*

*Primary Examiner* — Jeffrey A. Smith
*Assistant Examiner* — Jennifer V Lee
(74) *Attorney, Agent, or Firm* — Plumsea Law Group, LLC

(57) ABSTRACT

A computer system and method for transacting business over the Internet relating to vehicle purchasing. A first computer data base is provided having information regarding vehicles for sale wherein each vehicle has associated vehicle data parameters and a second computer data base is provided having information regarding a user wherein each user has associated user data parameters. A vehicle purchase server is provided that includes application software including a routine permitting the selection of specific vehicle data parameters from the first data base contingent upon user data parameters contained in the second data base based upon inquiries from a user regarding a vehicle description. Vehicle matching results including one or more vehicles recommended for the user are presented via a GUI accessible by the user.

8 Claims, 4 Drawing Sheets

(56) References Cited

U.S. PATENT DOCUMENTS

| | | |
|---|---|---|
| 2014/0279263 A1 | 9/2014 | Liu et al. |
| 2015/0363865 A1* | 12/2015 | Ramanuja .......... G06Q 30/0631 |
| | | 705/26.62 |
| 2016/0198306 A1 | 7/2016 | Miles et al. |

* cited by examiner

USER ACCESSES SYSTEM INTERFACE
402

USER IDENTIFICATION PROVIDED
404

USER VEHICLE INPUT PARAMETERS PROVIDED
406

SERVER RECEIVES INFORMATION
408

VEHICLE PARAMETERS DETERMINED
410

RETRIEVE USER INFORMATION
412

RETRIEVE DATA RELATED TO DETERMINED VEHICLE
PARAMETERS
414

PERFORM ANALYTICS TO DETERMINE RECOMMENDED
VEHICLES
416

DISPLAY RESULTS
418

SYSTEM AND METHOD FOR VEHICLE PURCHASING ANALYTICS

CROSS REFERENCE TO RELATED APPLICATIONS

This application is a Continuation of U.S. patent application Ser. No. 15/330,824 filed Nov. 7, 2016, which claims priority to U.S. Patent Application No. 62/251,993 filed Nov. 6, 2015, which are incorporated herein by reference in its entirety.

FIELD OF THE INVENTION

The disclosed embodiments generally relates to determining a vehicle to be acquired, and more particularly, to performing analytics on pre-stored user data to determine a vehicle to be purchased based on user criteria.

BACKGROUND OF THE INVENTION

A vehicle buying process currently involves the use of the internet to provide users with a desired vehicle. The internet is an ever evolving collection of countless computers linked together by an enormous network that allows the connected computers to communicate with each other. The software in the individual computers determines whether they understand each other and whether they work together to provide information and services. Therefore, in a correctly operating system the computers are interdependent on each other.

Using the internet, clients or potential customers can conduct research, obtain information and actually secure goods or services in a very short time without moving away from their computer. But even now after most businesses have embraced the internet, the traditional process for purchasing an automotive vehicle continues to prevail. That process is usually complicated and very time consuming. In many instances, it may be inconvenient for a customer to drive to multiple locations in search of the right vehicle at the right price. The customer may experience a tremendous lack of access to information concerning pricing, financing, options and vehicle availability. As a result, some customers have developed a general dislike for the process. Many customers are uncomfortable haggling to negotiate for a price they feel is fair for the vehicle they've selected or if they are even purchasing the proper vehicle that satisfies their needs and overall budgetary constraints.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer system and method for transacting business over the Internet relating to vehicle purchasing is described in which a first computer data base is provided having information regarding vehicles for sale wherein each vehicle has associated vehicle data parameters and a second computer data base is provided having information regarding a user wherein each user has associated user data parameters. A vehicle purchase server is provided that includes application software including a routine permitting the selection of specific vehicle data parameters from the first data base contingent upon user data parameters contained in the second data base based upon inquiries from a user regarding a vehicle description. Vehicle matching results including one or more vehicles recommended for the user are presented via a GUI accessible by the user.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
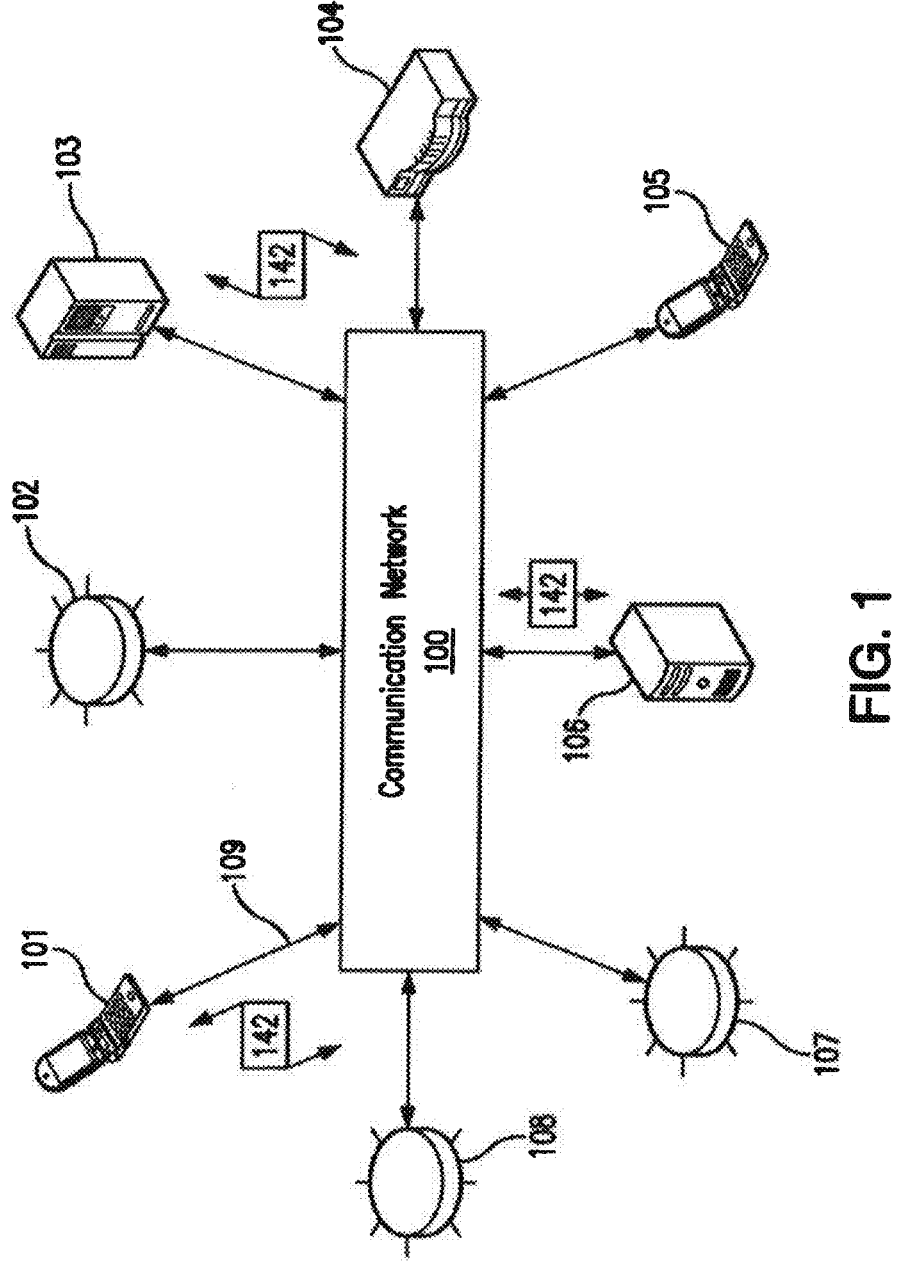
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 101, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
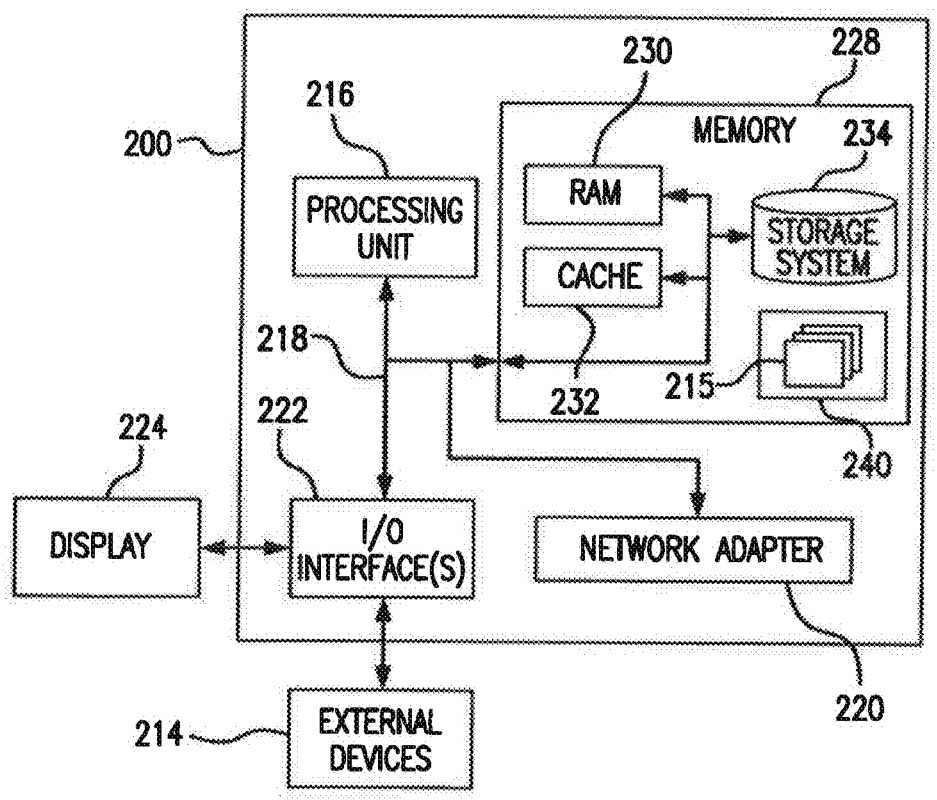
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media and/or Solid State Drives (SSD) (not shown and typically called a "hard drive"). Although not shown, an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present invention will now be provided. Since the illustrated embodiments disclosed herein rely upon the Internet, a brief discussion of the Internet is now provided.

A home or personal computer is usually networked with other computers via the internet by linking through a modem (or a cable line and cable modem), and communicates through an internet service provider (ISP). Computers used in businesses and other large organizations usually include a network interface card (NIC) that directly connects to a local area network (LAN) inside the business. The entire LAN and its connected computers may then be placed in communication with an ISP using a high speed data line. First line ISP's may be connected to even larger ISP's, with the largest ISP's including transmission lines with massive capacity that serve as a trunkline for a nation or region. The trunklines are connected globally through fiber optic lines, cables and satellite links providing virtually unlimited access globally to all the connected computers that offer an open port.

Managing all the machines communicating via the inter-net would seem an impossible task. Although communica-tions are sometimes corrupted or unsuccessful, in most cases the management system operates seamlessly. To accomplish the task, each machine on the internet is assigned a unique IP address. IP addresses are 32 bit numbers normally expressed as four octets in a dotted decimal number. A typical IP address can be something like the number: 098.76.54.321. The four numbers in the string address are called octets because they each have values between 0 and 255 (28 possibilities per octet). Every machine on the internet at any given time has a unique IP address, but a computer's IP address isn't necessarily always the same. Typically, a server has a static IP address that does not change very often. However, a personal computer or home machine that connects to the internet through a modem often has an IP address that is assigned by the ISP when the user dials in. In those cases where the IP address is changed, the particular IP address that is used is unique for the particular session on the internet at that particular time. In this way the ISP only needs one IP address for each modem it is actively supporting rather than for every customer. IP addresses are important because they enable the management of commu-nications between users of the internet.

Generally speaking, all of the computers on the internet can be categorized into two types: servers and clients. Those computers that provide services to other computers are known as servers. Those computers that are accessing the computers running such services are known as clients. When a typical web surfer contacts a site on the internet such as USAA.com at www.usaa.com, a web page is found. USAA-.com is providing a computer or a multitude of computers, connected to the internet to service the inquiring person's request. As such, USAA.com is a server. The computer of the other person is not providing a service on the internet in this situation and is therefore, a client. It is also common for a computer to function both as a server and a client when it performs both roles.

A server machine may provide one or more services on the internet. Clients that come to a server machine do so with a specific intent, so a client's request is directed to a specific server running the software that they want to access. For example, if the client is running a web browser on their machine, it will normally want to communicate with the web browser on the server machine. Similarly, a client's email application wants to communicate with email servers, etc.

Typing in an IP address is a way to initiate communication with a server connected to the internet, but servers on the internet also have an alpha numeric name called a domain name. For example, www.USAA.com is a permanent domain name. The domain name has three parts: (1) the host name (www), (2) the domain name (USAA) and (3) the top level domain name (com). Domain names are managed by an organization whose function is to ensure that all domain names within a top level domain name are unique. A set of servers called domain name servers maps the alphanumeric names with the IP addresses. Server computers on the internet open their services using numbered ports, one for each service that is available on the server. Clients connect to a service at a specific IP address and on a specific port number. If the server accepts connections on a port from outside, you can connect to the port from anywhere through the internet and use the service.

To obtain information from a particular web site, the user types the uniform or universal resource locator (URL) into a browser. The browser breaks the URL down into three parts (1) the protocol ("http"), (2) the server name ("www.ISP.com"), and (3) the file name ("web-server.htm"). The browser communicates with the main server to translate the server name into an IP address. The browser then forms a connection to the web server at that IP address on a port. Following the http protocol, the browser sends a request to the server asking for the file. The client and server commu-nicate exchanging information to format the site's web pages on the client's monitor screen.

A web page is a file that contains text along with a set of hyper text markup language (HTML) tags that describe how the text should be formatted when the browser displays it on the screen. The web browser manages the client's request to go to a web server on the internet and requests a page. The web browser also interprets HTML tags within the page to display the page on the client's screen as the page's creator intended it to look. The page often affords the client the opportunity to enter data, which the server manages and initiates responses to the entered data.

Figure 3:
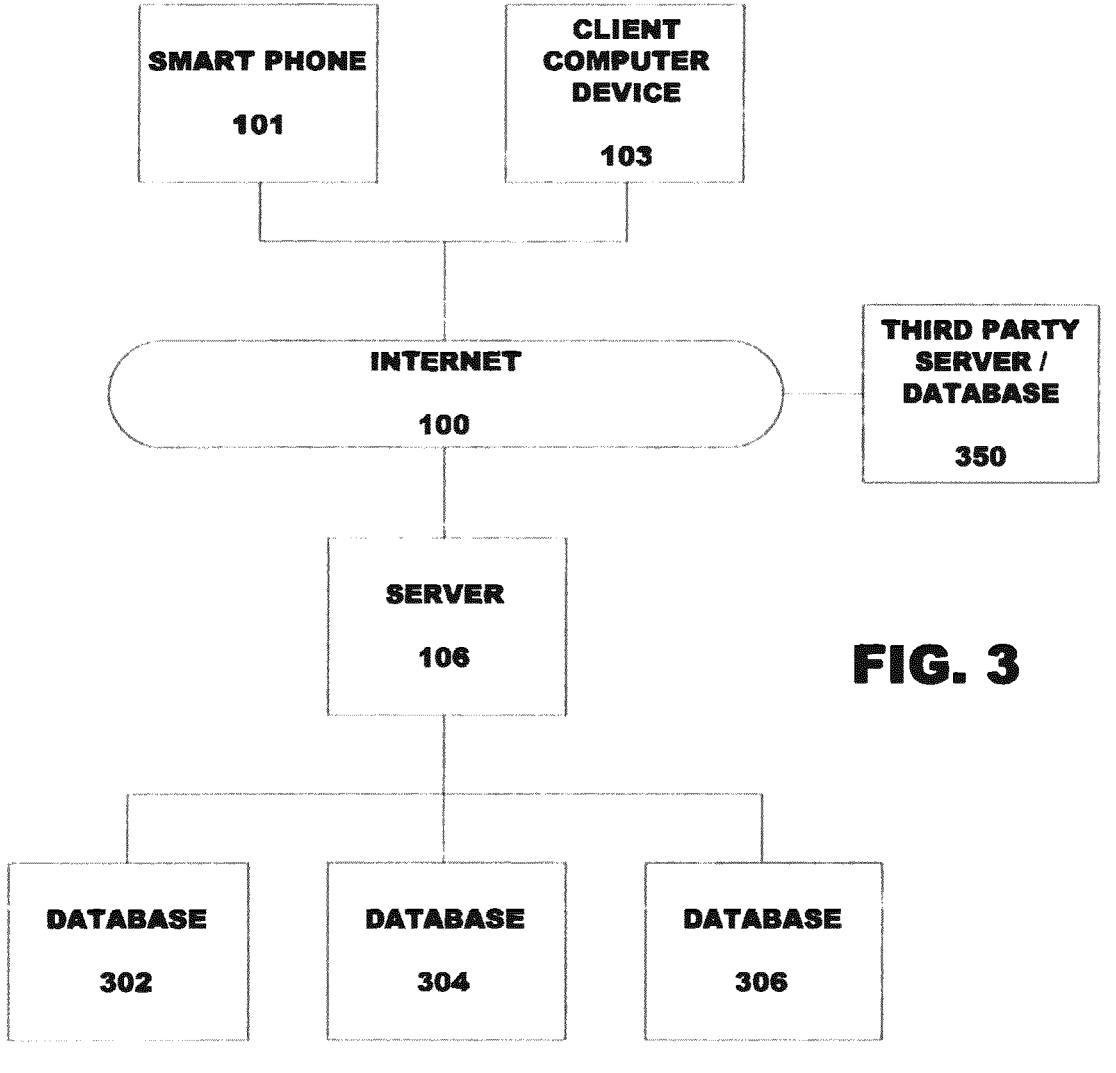
FIG. 3 illustrates a system diagram of an illustrated embodiment.

With reference now to FIG. 3, shown is a system level diagram demonstrating implementation of an illustrated embodiment. It is to be understood sales of vehicles under the preferred embodiment of the present invention involve a system and a method that require utilization of an Internet based e-commerce system, which requires a user interfacing with either an html website via a personal computer device 101, and/or a application executing on a user portable computing device 105. The illustrated embodiments require the use of a website that includes a database and application software (preferably executing on a server 106) that enables a user to input information (parameters) regarding a vehicle a user desires to purchase. The server 106 is coupled to one or more databases (302-306) containing pre-stored informa-tion regarding the user, typically captured from one or more user accounts, including (but not limited to): user financial accounts (banking (e.g., checking, savings, money market etc.) investment accounts (e.g., retirement, stock portfolio); insurance accounts and credit accounts. It is to be appreci-ated these user accounts contained in the one or more databases 302-306 are preferably user accounts which existed prior to the user initiating a search to purchase a vehicle thus having a primary purpose unrelated to the purchase of a vehicle. It is the one or more illustrated embodiments that provide a secondary purpose to the one or more user accounts so as to be utilized towards a decision process regarding a vehicle.

The server 106 is also preferably coupled to one or more servers 350 associated with third parties preferably containing detailed information regarding new vehicles, such as (but not limited to): makes; models; pricing; local inventory; color and/or configurations choices); vehicle parameters (e.g., type (sedan, coupe, SUV, truck, etc.); engine and/or transmission parameters); performance metrics; efficiency (MPG); warranty information; reliability and/or ratings data). For instance, the third party vendors associated with the one or more servers 350 may include car manufacturers; TrueCar®; Carfax®; Kelley Blue Book® and Consumer-Reports®.

Figure 4:
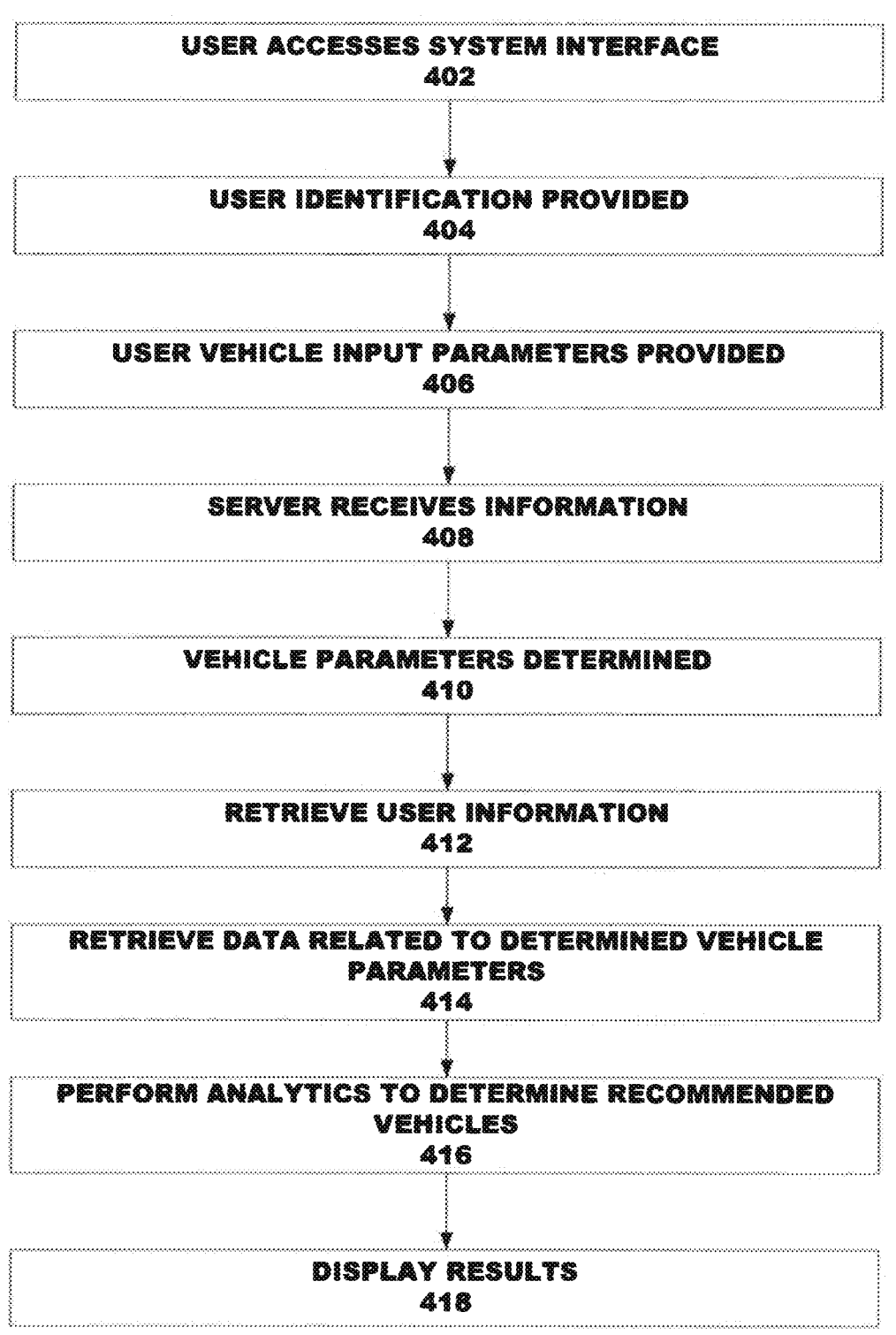
FIG. 4 illustrates a flowchart of an illustrated embodiment.

With the system components described above, and with reference now to FIG. 4, discussion will now turn to an illustrated use of the one or more embodiments. Starting at step 402, a user accesses an interface for initiating the process for determining a vehicle to be purchased. As mentioned above, this interface can be provided via an application (e.g., an app) executing on a user portable computing device 101 (e.g., a smart phone and/or tablet device) or via an HTML website hosted by the server 106 and accessed via a web browser provided on a personal computer device 402. Next (step 404), the user preferably enters identification information sufficient to be used by the server 106 to access information relating to the user from the one or more databases 302-306. Once the user's inputted identification is verified, the user then interacts with the aforementioned interface to input data regarding a vehicle desired to be purchased (step 406). It is to be appreciated this data can include one or more of the following parameters (and is not to be limited thereto) regarding a vehicle to be purchased:

Brand (E.g., Ford, Chevrolet, Jeep, BWM, Cadillac, etc.)

Body Type (coupe, sedan, SUV, convertible, truck, van, wagon, hybrid, etc.)

Model (includes color, engine size, transmission type and accessories)

Price (e.g., purchase, finance and/leasing)

Inventory availability

Operating efficiency (e.g., includes MPG, cost-of-ownership over time)

Warranty

Reliability and/or Ratings (e.g., vehicle must be above average)

It is noted this information may be inputted by the user in either a structured format or a open format. For instance, the server 106, via the aforementioned user interface, may provide a structured format to be followed by the user to enter specific information (e.g., Vehicle brand) which typically is accompanied by a drop-down menu presenting different selection options (e.g., vehicle brands, models, etc.) desired by the user. Alternatively, the server 106 may be configured to enable a user to provide a voice input via the interface to accept the user's spoken words regarding the desired vehicle (e.g., I would like a SUV from a domestic manufacture that is less than $30,000 and achieves greater than 25 combined MPG). The server 106 being configured to utilize natural language recognition techniques to covert the user's spoken words into data categories/parameters to be used for the below analytical process to match the user with a vehicle.

The server 106 receives (step 408) the aforesaid user inputted information (step 406) and preferably formats the user inputted information to a format suitable for analytic processing and comparison with pre-stored information regarding the user, typically captured from one or more user accounts, including (but not limited to): user financial accounts (banking (e.g., checking, savings, money market etc.) investment accounts (e.g., retirement, stock portfolio); insurance accounts and credit accounts contained in the one or more databases 302-306, as mentioned above (step 410). It is to be appreciated this formatted information preferably indicates the user's desired vehicle purchase parameters. The server 106 then, utilizing the aforesaid user desired vehicle purchase parameters, retrieves user information from the one or more databases 302-306 (step 412) information which is relevant to a vehicle purchasing decision. This information may include, and is not to be limited to: the user's financial situation (e.g., salary, other income, debt obligations, retirement plan, investment planning, alimony, housing expenses, mortgage, rent, etc.); user employment type (e.g., employment, career type and vehicle needs, length of commute, commute type (e.g., highways, local roads, off-road routes)); user recreational preferences (e.g., camping; hiking; theater, etc.); user family status (e.g., married, children (including age of children); types of pets, etc.); user driving record and any other information regarding the user that could be useful in a vehicle purchase decision that is stored in the one or more databases 302-306. Based upon the user input information setting forth parameters regarding a desired vehicle (step 406), the server 106 retrieves information relating to vehicles (step 414), which either matches the user desired vehicle (e.g., a blue Ford Fusion sedan having a 2.0 L AWD engine/transmission configuration) or has closely matched parameters (e.g., imported and domestic manufactured vehicles having sedan configuration with an AWD drivetrain). It is to be appreciated that the server 106 preferably relies upon an algorithm for determining "matching vehicles" relative to the desired vehicle as inputted by the user (step 406). This algorithm preferably includes a threshold setting/variable (which is preferably user configurable) for determining the closeness of a match. For instance, when the threshold is set to a high value, only data from very close matching vehicles will be retrieved from database 350 (e.g., a blue Ford Fusion sedan having a 2.0 L AWD engine/transmission configuration as inputted by the user as the desired vehicle (step 406) will cause data to be retrieved having the parameters: a domestic manufactured sedan having a AWD configuration). Conversely, when the threshold is set to a low value, data broadly matching vehicles will be retrieved from database 350 (e.g., a blue Ford Fusion sedan having a 2.0 L AWD engine/transmission configuration as inputted by the user as the desired vehicle (step 406) will cause data to be retrieved having the parameters: domestic and imported manufactured sedans having any type of drivetrain configuration).

Next (step 416), the server 106 is configured to determine a ranking of best matches relative to the aforesaid retrieved vehicle data from vehicle database 350 (step 414) and the retrieved user information from the one or more databases 302-306 (step 416). The server 106 preferably relies upon an algorithm for providing the best matches wherein some data parameters to be matched with one another are to be weighed more heavily than others. For instance, when it is determined the user has restricted financial ability to purchase a new car based upon an analysis conducted upon user information retrieved from the one or more databases 302-306 (e.g., the user only has $250 per month to spend on a vehicle after all monthly financial obligations are taken in count), this parameter is to be weighed more heavily than others (e.g., whether the car an integrated GPS mapping system). Also, when it is determined the user has such restricted financial ability to purchase a new vehicle, the server 106 is configured to take into account other financial variables regarding a vehicle purchase (e.g., MPG, cost of ownership/maintenance; insurance; etc.) regarding the recommendation ranking of the vehicles identified in step 414.

It is noted other factors are to be taken into account by server 106 when determining rankings of best matches, include (but are not limited to): how does a vehicle match the current lifestyle of the user (e.g., the user has three (3) children under the age of 10 years old, thus the server 106 will favor minivans, SUV's and sedans over a coupe or pickup); the user's daily commute (e.g., the user has a long commute, thus the server 106 will favor higher MPG vehicles, vehicles providing more longevity on its warranty and/or vehicles having a certain reliability rating); and the type of employment the user is engaged with (e.g., if the user is a self-employed contractor, a pickup/van type of vehicle is to be favored). It is to be appreciated that the vehicle matching server 106 is configured and functional to determine one or more personal variables indicative of a user, and relevant to a vehicle purchase, as retrieved from the one or more databases 302-306, and utilize those determined variables to match them up against data regarding vehicles that are determined to be desirable for purchase by the user so as to find the best overall match (step 416) between the user determined personable variables (step 412) and relevant retrieved vehicle parameters (step 414).

Once the vehicle matching results are determined, they are preferably displayed to a user via GUI provided on a user device (e.g., smartphone 101, user computing device 103, etc.). Furthermore, the server 106 may be configured to, utilizing data available in the third party vendor server 350, determine local price offerings and local inventory availability regarding the recommended vehicles (step 416) so as to further aid the user's vehicle purchase process.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer method for transacting business over the Internet to facilitate online purchase of a vehicle by a user using a user computing device coupled to a HTML web server to interact with an internet hosted e-commerce service coupled to a first computer database having information regarding vehicles for sale wherein each vehicle has associated vehicle data parameters and to a second computer database having information regarding the user including user data parameters wherein the second computer database is separate from the first computer database and is populated with data preexisting from when a user interacts with the internet hosted e-commerce service for purchasing a vehicle, comprising:

extracting data from the first computer database from a first network interface in response to the user's data input for a specified vehicle;

formatting the user's data input to a format suitable for analytical processing and comparison with user data in the second computer database, the first computer database being associated with a third party distinct from the second computer database, the user data in the second computer database being unrelated to the vehicle data in the first database;

comparing, utilizing the formatted user's data input, the user data unrelated to the vehicle data in the second computer database with data relating to vehicle data in the first computer data;

extracting data from the second computer database from a second network interface in response to the comparison of the user data unrelated to the vehicle data and the data relating to the vehicle data;

determining user specific information for recommendation of a vehicle for purchase by analyzing the received user online search regarding the user selected specified vehicle in view of the data extracted from the second computer database wherein the determined user specific information consists of: a) a length of commute associated with the user, and b) a family status of the user from the one or more insurance accounts associated with the user;

determining a preferred vehicle type for the user in response to: 1) data extracted from the first computer database regarding vehicles available for purchase; and 2) the determined user specific information;

identifying vehicles available for purchase in response to determining a preferred vehicle type; and causing to display on a Graphical User Interface (GUI) provided on a user device the vehicles identified for purchase by the user.

2. The computer method of claim 1, wherein the user computing device is a smart phone device.

3. The computer method of claim 1, wherein matching parameters for determining the preferred vehicle type include a threshold setting.

4. The computer method of claim 3, wherein the threshold setting is user selectable.

5. A computer method for transacting business over the Internet to facilitate online purchase of a vehicle by a user using a user computing device communicating with a HTML web server to interact with an internet hosted e-commerce service coupled to a first computer database having information regarding vehicles for sale wherein each vehicle has associated vehicle data parameters and to a second computer database having information regarding the user including user data parameters wherein the second computer database is separate from the first computer database and is populated with data preexisting from when a user interacts with the internet hosted e-commerce service for purchasing a vehicle, comprising:

extracting data from the first computer database from a first network interface in response to the user's data input for a specified vehicle;

formatting the user's data input to a format suitable for analytical processing and comparison with user data in the second computer database, the first computer database being associated with a third party distinct from the second computer database, the user data in the second computer database being unrelated to the vehicle data in the first database;

comparing, utilizing the formatted user's data input, the user data unrelated to the vehicle data in the second computer database with data relating to vehicle data in the first computer data;

extracting data from the second computer database from a second network interface in response to the comparison of the user data unrelated to the vehicle data and the data relating to the vehicle data;

determining user specific information for recommendation of a vehicle for purchase by analyzing the received user online search regarding the user selected specified vehicle in view of the data extracted from the second computer database wherein the determined user specific information consists of: a) a length of commute associated with the user, and b) a family status of the user from the one or more insurance accounts associated with the user;

determining a preferred vehicle type for the user in response to: 1) the data extracted from the first computer database regarding vehicles available for purchase; and 2) the determined user specific information;

identifying vehicles available for purchase in response to determining a preferred vehicle type; and causing to display on a Graphical User Interface (GUI) provided on a user device the vehicles identified for purchase by the user.

6. The computer method of claim 5, wherein the user computing device is a smart phone device.

7. The computer method of claim 5, wherein matching parameters for determining the preferred vehicle type include a threshold setting.

8. The computer method of claim 7, wherein the threshold setting is user selectable.

* * * * *